Dec. 12, 1961  K. E. WILSON  3,012,581
PIPE COUPLING SYSTEM FOR VALVES
Filed Aug. 28, 1958  3 Sheets-Sheet 3
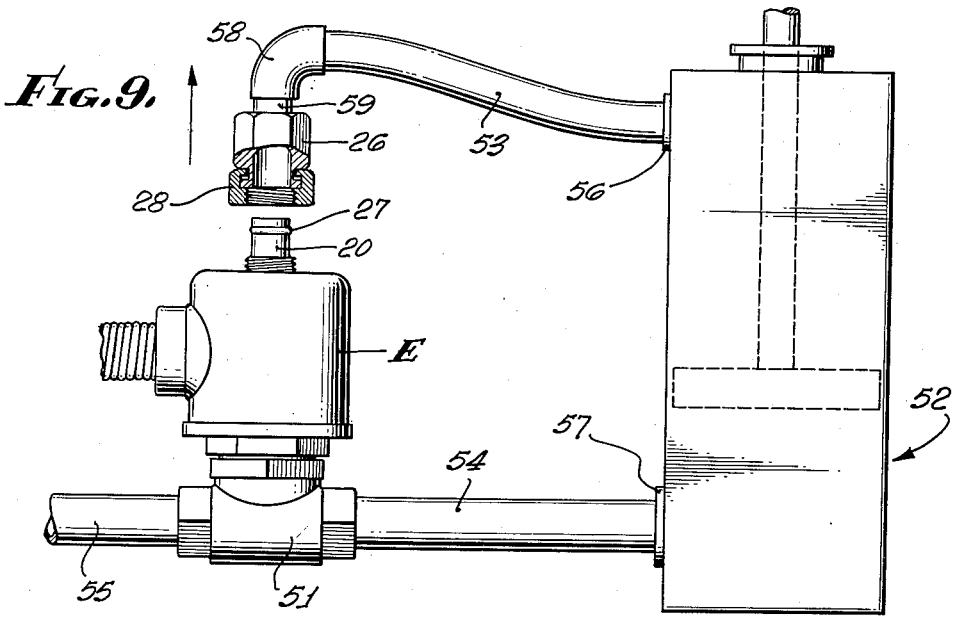
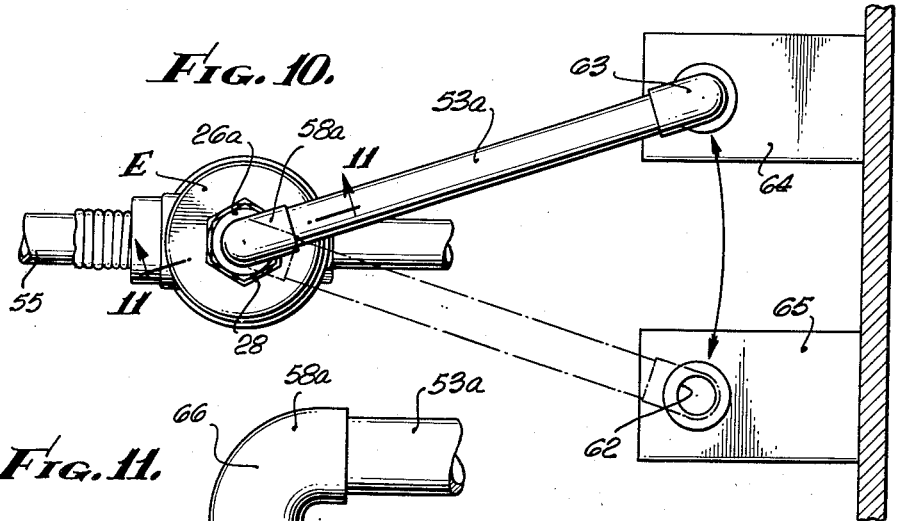
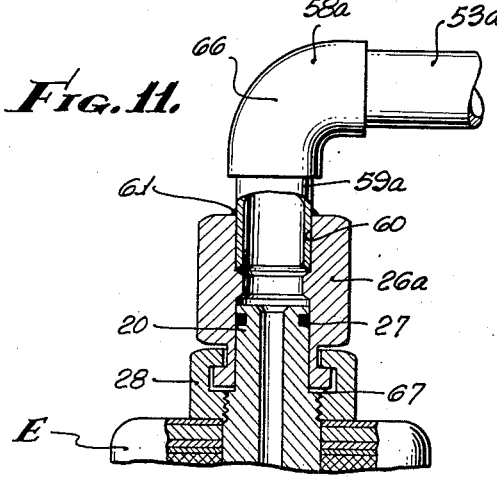
INVENTOR.
KEITH E. WILSON
BY
Flam and Flam
ATTORNEYS.

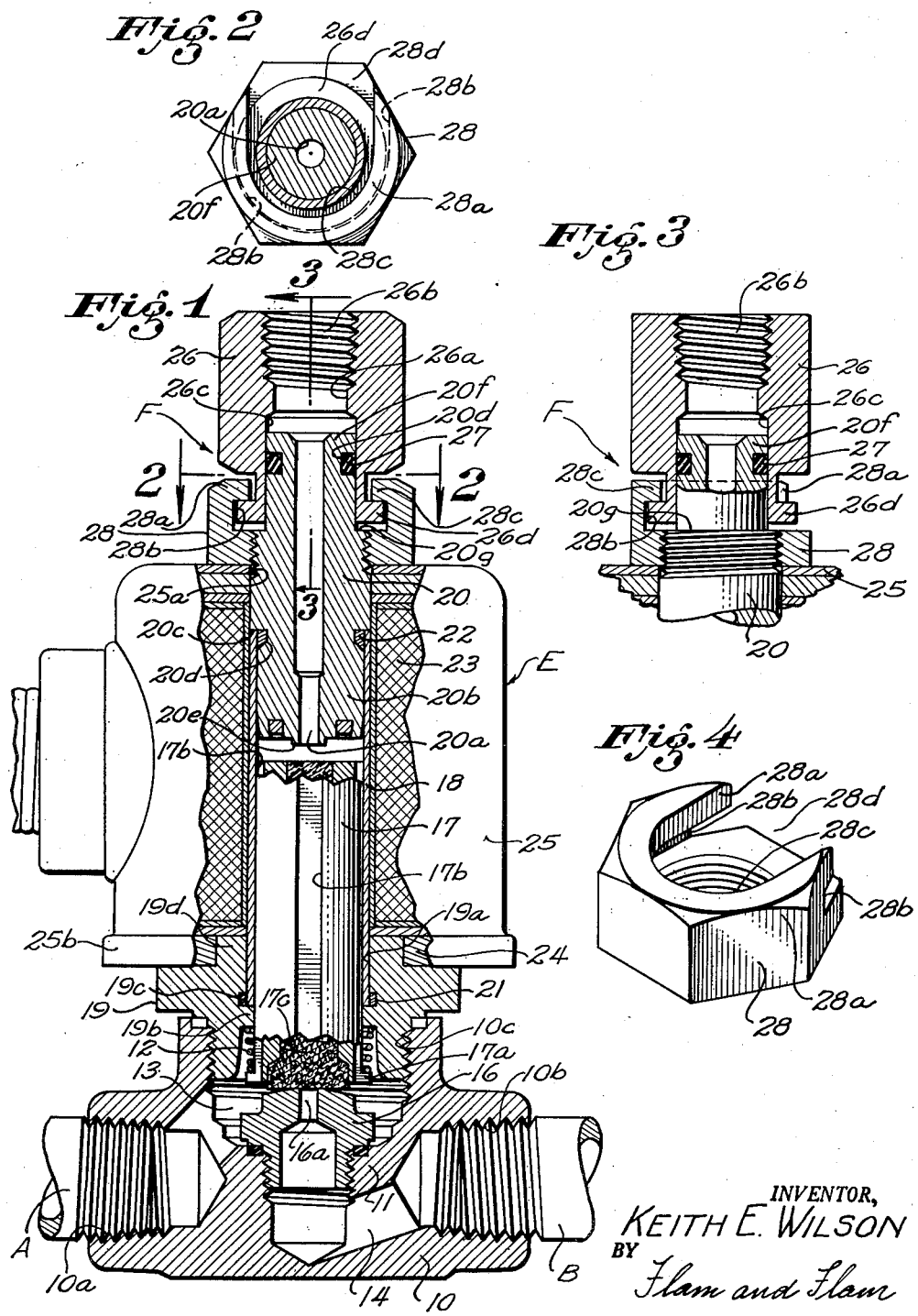

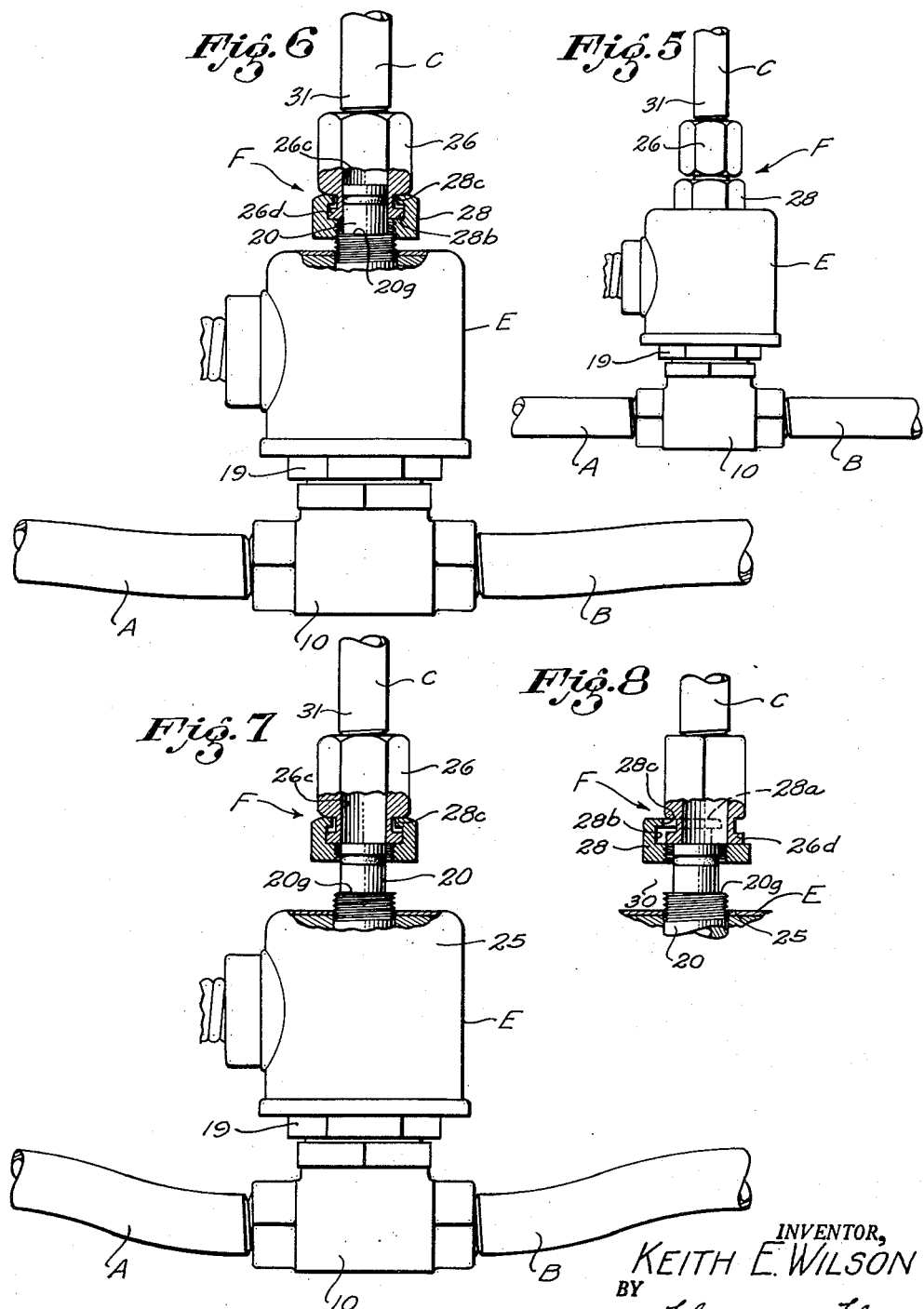

United States Patent Office 3,012,581
Patented Dec. 12, 1961

3,012,581
PIPE COUPLING SYSTEM FOR VALVES
Keith E. Wilson, Van Nuys, Calif., assignor to General Controls Co., Glendale, Calif., a corporation of California
Filed Aug. 28, 1958, Ser. No. 757,819
5 Claims. (Cl. 137—625.5)

This invention relates to a pipe or tube coupling for an electromagnetically operated two- or three-way valve, and especially useful in a valve installation wherein a fluid conduit connects to structure extending generally perpendicular to the axis of the other conduit or conduits, the transverse conduit extending through the electromagnet.

This application is a continuation-in-part of application Serial No. 503,701, filed April 25, 1955, now abandoned.

In a valve structure of this character, it has been common, for example, to provide unions for the aligned conduits while a direct connection is provided to the transverse conduit. In such organization, for purposes of installation, the valve is first connected to the transverse conduit by rotation of the entire valve about the axis of this transverse conduit. Thereafter, the other conduits are connected to the valve structure by the aid of the unions. Connection thereafter may be made between the electromagnet leads and an electrical source. In removing the valve structure in order that the parts thereof may be repaired or replaced, the reverse procedure is followed. Disconnection of the transverse conduit is necessary to gain access to the valve parts. To disassemble the structure to make the valve parts accessible, the aligned conduits must be disconnected so that the valve can be turned about the axis of the transverse conduit. This means either disconnecting the electromagnet leads or allowing enough slack to permit twisting of the ends.

It is an object of the present invention to provide an improved coupling structure in which these disadvantages are overcome. This is made possible by providing a novel coupling between the transverse conduit and the valve structure whereby connections to the aligned conduits need not be removed at all. This arrangement obviates relative rotation between the electromagnet and the valve parts without disconnecting the electromagnet from the source; also, this arrangement makes it possible for the valve parts to be accessible by disconnecting only one of the conduits, disconnection of the aligned conduits being unnecessary to gain access to the valve parts.

A coupling structure of this character is capable of operation in this manner by utilizing the flexible characteristics of the conduits.

Another object of this invention is to provide coupling of this character in which the conduit is freely rotatable about the axis of the coupling without disturbing the seal.

It is another object of this invention to provide a novel coupling structure of this character that comprises a few simple and inexpensive parts.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:
FIGURE 1 is a longitudinal sectional view of an electromagnetically operated valve structure incorporating the present invention;
FIG. 2 is a sectional view, taken along the line 2—2 of FIG. 1;
FIG. 3 is a fragmentary sectional view, taken along the plane indicated by line 3—3 of FIG. 1;
FIG. 4 is a pictorial view of the lock nut forming a part of the apparatus shown in FIG. 1;
FIG. 5 is an elevation of a valve structure shown in installed position with three conduits;
FIG. 6 is a view similar to FIG. 1, but showing conduits cooperating with the valve, the valve being in the initial stage of disassembly from the installation;
FIG. 7 is a view similar to FIG. 5, but showing the conduit at the top of the valve disconnected and ready to be separated from the valve;
FIG. 8 is a fragmentary view similar to FIG. 7, but showing the valve and top conduit partially separated by relative tilting movement of the parts;
FIG. 9 illustrates diagrammatically a different installation of the valve;
FIG. 10 diagrammatically illustrates still another installation in which the dynamic character of the seal is utilized; and
FIG. 11 is an enlarged fragmentary sectional view, taken along a plane indicated by line 11—11 of FIG. 10.

In FIG. 5 there is shown an electromagnetically operated valve structure cooperable with three conduits A, B and C. The conduit A may be connected to a source of high fluid pressure, and the other conduits connected, for instance, to a load. The conduits B and C are alternately connected to the pressure conduit depending upon energization or deenergization of the electromagnet E. Conveniently, one of the conduits C extends axially upwardly of the electromagnet for control by a plunger associated with the electromagnet. The plunger also controls a port between the conduits A and B.

Instead of providing unions for the conduits A and B, a coupling structure F is provided between the conduit C and the valve structure. By disconnecting the coupling, the valve structure is moved downwardly, away from the conduit C by flexure of the conduits A and B until the conduit C is out of the way. The conduits A and B are therefore preferably made from thin walled tubing so as to facilitate the flexure of these elements. This not only makes disconnection of the conduits A and B unnecessary, but avoids turning movement of the electromagnet, and the problem regarding its leads. After disconnection, the electromagnet structure can be lifted from the valve proper and the valve parts made accessible for replacement or repair.

The valve structure shown in detail in FIG. 1 comprises a valve body 10 having aligned exteriorly opening passages 10a and 10b on opposite sides, and an opening 10c extending upwardly from the body. A partition 11 defines separate chambers 13 and 14 on opposite sides thereof. The chamber 13 communicates with the openings 10a and 10c, and the chamber 14 communicates with the passage 10b. A valve seat insert 16, threadedly accommodated in an aperture of the partition 11, has a port 16a by which the chambers 13 and 14 may be placed in communication.

A valve closure structure 17 located in the chamber 14 is provided for controlling the port 16a. The closure structure 17 extends upwardly through the upper opening 10c of the valve body 10, and is guided for longitudinal movement in a guiding sleeve 18. This structure is in the form of an elongated cylinder, carrying a resilient closure 17c directly cooperating with port 16a.

An apertured cap 19 threadedly received in the body opening 10c mounts the sleeve. For this purpose, the lower end of the sleeve is received in the upper end 19a of the aperture in the cap 19 and abuts an intermediate flange 19b formed within the cap 19. Solder 21, located in an annular recess or groove 19c immediately above the flange 19b, holds the sleeve 18 in place.

A compression spring 12 engages at opposite ends a terminal flange 17a of the closure structure 17, and the flange 19b, and urges the closure structure 17 downwardly into engagement with the valve seat insert 16. In such position, communication between the valve chambers 13 and 14 is interrupted.

The chamber 13 is intended selectively to communicate with conduit C at the top of the valve via the sleeve 18. A plug 20, secured in place at the upper end of the sleeve 18, serves as means for connection to the upper conduit C in a manner to be hereinafter more fully described.

A lower reduced portion 20b of the plug, defined by a downwardly facing shoulder 20c, is received in the upper end of the sleeve 18, the shoulder 20c abutting the end edge of the sleeve. Solder 22, located in an annular recess or groove 20d of the plug at the base of the reduced portion 20b, secures the plug to the sleeve. The plug has an axial through pasasge 20a.

The closure structure 17 has a series of longitudinally extending, peripherally located slots 17b to establish communication between the chamber 14 and the space above the upper end of the closure structure.

In the position of the closure structure 17 shown in FIG. 1, the valve chamber 13 is in communication with the plug aperture 20a via the slots 17b in the closure structure 17, the upper end of the closure structure 17 being spaced from the seat 20e. However, when the closure structure 17 is moved upwardly into engagement with the seat 20e, communication between chamber 13 and the plug passage is interrupted. In this position, however, communication between the chambers 13 and 14 is established. Accordingly, either the plug aperture 20a or the chamber 13 is placed in communication with the chamber 14.

In order to move the closure structure 17 to uncover the port 16a, an electromagnet coil 23 is provided. This coil surrounds that portion of the sleeve 18 extending upwardly from the cap 19. The closure structure is made of appropriate magnetic material and is pulled upwardly on energization of the coil 23.

A ring 24, fitting a reduced upper end 19d of the cap 19, cooperates with a cup-like casing 25 to provide an enclosure for the coil 23. The casing 25 has a central aperture 25a permitting passage of the plug 20. A flange 25b, formed about the edge of the casing 25, fits about the peripheral portion of the ring 24.

The transverse conduit C (FIGS. 5 and 6) is coupled to the plug 20 by the aid of a connector 26. The connector has a through aperture 26a appropriately internally threaded at one end, as at 26b, for receiving the conduit 31. An exteriorly threaded nipple could, of course, be provided instead of the threaded opening 26b. The other end 26c of the connector 26 is enlarged for reception of the reduced upper end 20f of the plug 20. This upper end 20f of the plug 20 is defined by an upwardly facing shoulder 20g. An O-ring 27, accommodated in an annular groove 20d at the reduced end of the plug 20, ensures a sealing relationship between the connector 26 and the plug 20. The seal is established when the plug and connector are telescoped. The seal furthermore is maintained even during angular movement of the parts about the common axis of the plug 20 and the connector 26.

To secure the electromagnet casing 24—25 in place and also to hold the connector 26 against removal from the plug 20, a clamp or lock nut 28 is provided. The nut 28 cooperates with threads provided on the intermediate portion of the plug 20 adjoining the upper shoulder 20g, the threads being accessible above the casing 25 when the casing is in place. The casing is engaged by one end of the nut 28 upon rotation thereof in one direction. By tightening the nut 28, casing parts 24 and 25 are clamped against the extension 19.

The upper end 28a of the nut 28 is formed as a generally arcuate or C-shaped wall extending only partially about the nut opening. The upper nut end has an undercut groove that defines an inwardly returned, generally arcuate flange 28a on the upper end of the nut. A circular, outwardly extending flange 26d at the lower portion of the connector 26 is received within the groove 28b. The nut 28 can be removed from or inserted into the connector 26 by movement of the flange 26d outwardly or inwardly, as the case may be, through the open portion 28d of the upper end of the nut 28 (FIG. 2).

When the parts are placed upon the plug 20 (FIG. 3), the plug interlocks the nut 28 and the connector 26 against separating movement.

Rotation of the nut 28 pulls the connector 26 downwardly through interengagement of the flanges 28c and 26d of the respective parts. The parts are so proportioned that the upwardly extending shoulder 20g of the plug is substantially flush with the lower surface of the counterbore when the nut 28 is fully tightened. This relationship, together with the fact that the width of the groove 28b is greater than that of the connector flange 26d received therein, ensures against binding the connector. Accordingly, if desired, the connector can be rotated for attaching or removing the conduit C while the parts are otherwise in assembled position.

Ordinarily to install the valve, connection of conduits A and B can first be made to the valve body 10 (FIG. 5). The connector 26, apart from the remaining structure, is attached to the conduit C. The lock nut 28 is then placed upon the connector flange 26d and the parts 26 and 28 together brought over the reduced end of the plug 20. The lock nut 28 is then rotated, clamping the casing parts 24 and 25 in place and drawing the connector 26 downwardly therewith.

To disassemble the valve structure, the lock nut 28 is loosened (FIG. 6). While the lock nut 28 is being moved toward fully disengaged position with respect to the threads on the plug 20, a slight relative longitudinal movement between the connector 26 and the remaining valve structure takes place, the bottom of the groove 28b engaging the bottom of the connector flange 26d. The flexible characteristics of the conduits A and B or C (which may be made of copper, for instance) permit such movement. When the nut 28 is fully out of threaded engagement with the plug 20, the plug 20 can be pulled downwardly along the nut 28 and the connector 26, further flexing the conduits (FIG. 7). In the position shown in FIG. 7, the upper end of the plug 20 is just beneath the lower end of the connector 26 and thus no longer interlocks the nut and connector against separating movement. The connector 26 can be separated from plug 20 by transverse tilting movement of the valve body and electromagnet structure away from the open end 28d of the nut end, such as indicated by arrow 30 in FIG. 8. If desired, the parts may be separated by pulling the nut 28 and connector 26 completely from the plug 20.

When the valve body structure and electromagnet parts carried therewith are tilted to one side, the casing 25 and the electromagnet coil 23 may be lifted from the sleeve 18. Thereafter, the extension 19 can be detached from the valve body 10, and the valve parts made accessible.

Repair of the valve or replacement of parts can thus be accomplished without disturbing the threaded relationship between any of the conduits and the parts with which they are associated. Furthermore, this mode of attachment of parts obviates the turning of the valve structure about its longitudinal axis, which would cause the leads for the electromagnet to be twisted.

In FIG. 9 there is diagrammatically illustrated another installation in which the connector structure 20—26—28 is conveniently usable. In this example, the electromagnet E is mounted upon a four-way valve structure 51 having parts, including the plug 20 and the sleeve (not shown), similar to those of the valve structure described in the previous form.

Two generally parallel motor conduits 53 and 54 connect with opposite ends of the cylinder structure 52, the cylinder having apertured embossments 56 and 57 to facilitate the connection.

The valve structure 51 serves selectively to connect a pressure supply conduit 55 to either of these conduits while exhausting the other to an exhaust opening or return conduit (not visible in FIG. 9).

The conduit 53 cooperates removably with the plug 20, and the conduit 54 cooperates with one of two opposite, aligned passages of the body 51. An elbow 58 allows for the right-angle relationship between the plug 20 and the passage of the body 51 at which the conduit 54 is connected.

A short pipe length 59 projects from one end of the elbow 58 and is secured to the connector 26, the conduit 53 connecting to the other end of the elbow 58.

In the present example, the connector 26 is separable from the plug 20 by utilizing flexure of the conduit 53 attached to the connector 26.

The electromagnet E is accessible for removal by angularly moving the electromagnet E and the valve body 51 as a unit about the common axis of the conduits 54 and 55 after the connector 26 is caused to clear the plug 20 by flexure of conduit 53. The pipe length 59, elbow 58 and conduit 53 are now out of the way of separating movement of the electromagnet E.

In FIGS. 10 and 11, a connector 26a, plug 20 and nut 28 are provided. In the present example, a conduit 53a, elbow 58a and short pipe length 59a cooperate with an end of the connector 26a. The connector 26a is similar to the connector 26 previously described, except that its upper end, as at 60, is unthreaded for direct telescopic insertion of a thin copper tube 59a. The tube 59a is secured appropriately, as by solder 61, to the connector 26a. Other appropriate means for securing a thin copper tube may, of course, be utilized.

The elbow 58a and a conduit 53a complete an arrangement generally similar to that illustrated in FIG. 9, except that a spout member 63 attached to the end of the conduit part 53a provides a free discharge opening 62. This opening may be moved between two containers, receptacles, hoppers or the like 64 and 65 by rotation of the entire conduit structure 53a—58a—59a about the axis 66 of the plug 20 and connector 26a. The nut 28 does not clamp the connector 26a against any surface; it merely prevents separating movement thereof. Accordingly, clearance is provided, as at 67. Angular movement of the conduit structure is, accordingly, made possible by the very means whereby it is connected to the valve structure. It is unnecessary to provide an additional joint permitting this mode of movement, and at the same time, electromagnet and valve parts are readily accessible.

The inventor claims:

1. In an electromagnetically operated valve structure: a valve body having a pair of substantially aligned passages extending outwardly of the body in opposite directions, and having provisions for connection respectively to a pair of substantially aligned conduits; passage forming means including a cover for the body having an opening transverse to the passages, and a sleeve affixed in the cover opening and extending in a direction transverse to the aligned passages; said passage forming means including a plug member having an opening; a closure guided by the sleeve and controlling said passages and said opening; an electro-magnet coil structure telescopically and removably received on the sleeve; a hollow connector member adapted to be affixed at one end to a transverse conduit and cooperable with said plug member at the other end; said members having parts telescopically cooperable with each other; one of said parts including an O-ring whereby a seal between the members is maintained during relative angular movement between the members about the axis of the O-ring; the other of said parts providing a cylindrical surface cooperable with said O-ring whereby a seal between the members is maintained during relative longitudinal movement between the members; said connector and said plug being separable by flexing the transverse conduit and the aligned conduits away from each other to provide access to said electromagnet coil structure; a nut member threadedly engaging and separable from said passage forming means and urging the coil structure against the body for selectively preventing separation of the coil structure from the passage forming means; said connector and nut member having parts limiting axial separation therebetween.

2. The combination as set forth in claim 1 in which said parts of said nut member and said connector provide clearance in an axial direction for angular movement therebetween.

3. In an electromagnetically operated valve structure: a valve body having a pair of substantially aligned passages extending outwardly of the body in opposite directions, and having provisions for connection respectively to a pair of substantially aligned conduits; passage forming means including a cover for the body having an opening transverse to the passages, and a sleeve affixed in the cover opening and extending in a direction transverse to the aligned passages; said passage forming means including a plug member having an opening; a closure guided by the sleeve and controlling said passages and said opening; an electromagnet coil structure telescopically and removably received on the sleeve; conduit means having parts extending transverse to each other, one part terminating in a discharge opening; a hollow connector member secured at one end to another part of said conduit means and cooperable with said plug member at the other end; said members having parts telescopically cooperable with each other; one of said parts including an O-ring whereby a seal between the members is maintained during relative angular movement between the members about the axis of the O-ring; the other of said parts providing a cylindrical surface cooperable with said O-ring whereby a seal between the members is maintained during relative longitudinal movement between the members; said connector and said plug being separable by flexing the transverse conduit and the aligned conduits away from each other to provide access to said electromagnet coil structure; a nut member threadedly engaging and separable from said passage forming means and urging the coil structure against the body for selectively preventing separation of the coil structure from the passage forming means; said connector and nut member having parts limiting axial separation therebetween.

4. The combination as set forth in claim 3 in which said parts of said nut member and said connector provide clearance in an axial direction for angular movement therebetween.

5. In an electromagnetically operated valve structure: a valve body having a first passage, a second passage, and a port connecting said passages; the first passage being an inlet and the second forming an outlet; a cover for the body defining a space in continuous communication with the first passage; a guiding sleeve carried by the cover and extending outwardly of said space; a plug member of magnetic material carried by the sleeve at a place remote from the space; said plug member having a longitudinal opening; said opening defining a second outlet; a closure member being at least partly of magnetic material guided by the sleeve and operating either to close the port or the said longitudinal opening; an electromagnet having a central opening into which the sleeve is received; said electromagnet resting upon the cover; the closure member being in a position to close the longitudinal opening and to open the port when the electromagnet is energized; said plug member having a threaded portion extending out of the sleeve and adjacent the top of the electromagnet; said plug member also having a cylindrical portion extending beyond the threaded portion; a hollow member having a cylindrical surface telescoping over the cylindrical portion; a nut engaging the threaded portion for urging the electromagnet in place, and having means engaging the hollow member for restraining it from moving out of engagement with the plug; an O-ring between the plug and the hollow member; and a conduit connected to the hollow member; said hollow member being only frictionally restrained by said nut against angular movement with respect to the plug member.

References Cited in the file of this patent

UNITED STATES PATENTS

| | | |
|---|---|---|
| 487,842 | King | Dec. 13, 1892 |
| 1,034,882 | Crane | Aug. 6, 1912 |
| 1,811,283 | Smith | June 23, 1931 |
| 2,051,124 | Aull | Aug. 18, 1936 |
| 2,424,682 | Ebert | July 29, 1947 |
| 2,564,427 | De Rugeris | Aug. 14, 1951 |
| 2,614,584 | Geopfrich | Oct. 21, 1952 |
| 2,710,162 | Snoddy | June 7, 1955 |
| 2,840,108 | Clymer | June 24, 1958 |
| 2,861,594 | Collins | Nov. 25, 1958 |
| 2,887,126 | Frantz | May 19, 1959 |